United States Patent
Nelson

(10) Patent No.: US 7,873,743 B2
(45) Date of Patent: Jan. 18, 2011

(54) ELECTRONIC APPARATUS WITH ROUTER DEVICE FOR MANAGING CONNECTIONS

(75) Inventor: Joakim Nelson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 548 days.

(21) Appl. No.: 11/347,286

(22) Filed: Feb. 6, 2006

(65) Prior Publication Data

US 2007/0130285 A1  Jun. 7, 2007

Related U.S. Application Data

(60) Provisional application No. 60/741,883, filed on Dec. 5, 2005.

(51) Int. Cl.
*G06F 15/173* (2006.01)

(52) U.S. Cl. .................................... 709/238

(58) Field of Classification Search ............... 709/238, 709/217, 220, 223
See application file for complete search history.

(56) References Cited

U.S. PATENT DOCUMENTS

| | | | |
|---|---|---|---|
| 6,560,329 B1 * | 5/2003 | Draginich et al. ...... | 379/265.02 |
| 6,570,879 B1 * | 5/2003 | Kikuchi ............... | 370/395.21 |
| 6,590,869 B1 * | 7/2003 | Beyda et al. ........... | 370/248 |
| 6,700,956 B2 * | 3/2004 | Chang et al. ........... | 379/93.09 |
| 6,731,625 B1 * | 5/2004 | Eastep et al. .......... | 370/352 |
| 6,791,970 B1 * | 9/2004 | Ng et al. ............... | 370/352 |
| 6,853,851 B1 | 2/2005 | Rautiola et al. | |
| 6,909,708 B1 * | 6/2005 | Krishnaswamy et al. .... | 370/352 |
| 7,031,444 B2 * | 4/2006 | Shen et al. ............. | 379/88.17 |
| 7,072,328 B2 * | 7/2006 | Shen et al. ............. | 370/352 |
| 7,116,435 B2 * | 10/2006 | Tanimoto .............. | 358/1.15 |
| 7,145,898 B1 * | 12/2006 | Elliott ................ | 370/352 |
| 7,167,549 B2 * | 1/2007 | Hirschman et al. ...... | 379/114.08 |
| 7,414,996 B2 * | 8/2008 | Fan .................... | 370/338 |
| 2001/0012282 A1 | 8/2001 | Yegoshin | |
| 2004/0057568 A1 | 3/2004 | Kawabata et al. | |

FOREIGN PATENT DOCUMENTS

| | | |
|---|---|---|
| EP | 1 063 832 A1 | 12/2000 |
| WO | WO 00/14935 A2 | 3/2000 |
| WO | WO 2005/029901 A2 | 3/2005 |

* cited by examiner

*Primary Examiner*—David Y Eng
(74) *Attorney, Agent, or Firm*—Harrity & Harrity, LLP

(57) ABSTRACT

A method and electronic apparatus is provided for establishing a connection in a first electronic apparatus to a second electronic apparatus using one of a plurality of clients. The method comprises determining whether the first electronic apparatus and the second electronic apparatus, to which a connection is requested, is operating in the same network; establishing the connection using a first client if the first and second electronic apparatuses are operating in the same network; and establishing the connection using a second client if the second electronic apparatus is operating in a different network than the first electronic apparatus.

31 Claims, 4 Drawing Sheets

ELECTRONIC APPARATUS WITH ROUTER DEVICE FOR MANAGING CONNECTIONS

RELATED APPLICATIONS

This application claims priority under 35 U.S.C. §119 based on U.S. Provisional Application Ser. No. 60/741,883, filed Dec. 5, 2005, the disclosure of which is incorporated herein by reference.

TECHNICAL FIELD OF THE INVENTION

The present invention relates to an electronic apparatus comprising a router device. The router device is adapted to determine how a connection should be made to another electronic apparatus. The invention also relates to a method for establishing a connection between electronic devices in a communication system.

DESCRIPTION OF RELATED ART

In an electronic apparatus, such as a mobile terminal, a router device may be used to connect the electronic apparatus to another electronic apparatus. Different types of networks through which the two electronic apparatuses can communicate are in various stages of development.

For example, mobile networks can today carry and handle data traffic partly by use of packet data (e.g. according to 3G). This will allow for Voice over IP services (VoIP) once the network capability (acceptable latency, data speed, etc.) is improved to allow these services. With 3G and later on HSDPA, mobile networks will have the capability to run VoIP services with acceptable quality. The introduction of WLAN will be another alternative for VoIP services since more and more mobile devices will be equipped with WLAN functionality.

One concern for connections that are not circuit switched (CS) connections will be the quality. For example, the quality of service for VoIP over cellular networks may not be equally good as traditional CS voice, at least initially, but for certain consumer segments that may be OK. Furthermore, a lower quality of service might be acceptable when a user calls e.g., a friend but not when the user calls a business associate. Using the techniques know in the art, the user has to manually chose how to set up the connection. Thus, using different access techniques to set up calls may make the electronic apparatus cumbersome to manage.

A concern for network operators may be how to charge for these services. Traditional circuit switched (CS) voice has often a per minute pricing while packet switched (PS) data has flat rate or bucket pricing.

VoIP may be introduced on top of an ordinary data channel, e.g., by using a Skype client on top of 3G. That could then mean that the traditional pricing model for the network operators will be destroyed—i.e., people pay for data but are using a premium voice service. This is highly un-attractive from an operator perspective since it drains one of the most profitable services they offer, voice traffic.

One of the costs and also potential revenues for an operator is the interconnect fee to other operators. This means that an outgoing call from one operator to another has to include the interconnect fee, to be paid to the other operator. On the other hand, will an incoming call generate in interconnect fee from the other operator. One way to diminish this cost is to offer a low price for calls within an operator's network, e.g., "Friends & Family" packages. This may then generate a customer base in the own network without having to charge other operators parts of the incomes. This means that operators favors calls within its own network.

Thus, there is a need for a method and apparatus within an electronic apparatus to decide what connection options are available for each call and to connect each call using the connection option dictated by the user's or network operator's rules or preferences.

SUMMARY OF THE INVENTION

According to a first embodiment, a method for establishing a connection in a first electronic apparatus to a second electronic apparatus using one of a plurality of clients, comprises determining whether the first electronic apparatus and the second electronic apparatus, to which a connection is requested, is operating in the same network; establishing the connection using a first client if the first and second electronic apparatuses are operating in the same network; and establishing the connection using a second client if the second electronic apparatus is operating in a different network than the first electronic apparatus.

The determining may comprise determining an identifier for a network or network operator for the second electronic apparatus; and determining whether the determined identifier matches an identifier for the network or network operator of the first electronic apparatus.

The method may comprise setting up a circuit switched connection when the first client is used.

The method may comprise setting up a PS connection when the second client is used.

The method may comprise using a voice over IP connection to set up the PS connection.

The method may comprise using a WLAN connection to set up the PS connection.

The method may comprise retrieving said identifier from a database stored within the first electronic apparatus.

The method may comprise retrieving said identifier from a database stored externally from the first electronic apparatus.

The method may comprise retrieving the identifier from a database provided by the network operator of the first electronic apparatus.

The method may comprise retrieving the identifier from a database, which is manually created by a user of the first electronic apparatus.

The first client may be the client which provides the strongest connection.

The first client may be the client which provides the cheapest connection.

The first client may be the client which provides the connection with the lowest interconnect fees.

The method may comprise selecting any one of the available clients when an identifier for the second electronic apparatus can not be determined.

According to a second embodiment, a method for establishing a connection in a first electronic apparatus using one of a plurality of clients in a communication system comprises determining whether the first electronic apparatus and the second electronic apparatus, to which a connection is requested, is operating in the same network; determining if a plurality of clients are available to be used to set up the connection to the second electronic apparatus; and establishing the connection using a selected client from said plurality of clients, wherein the selected client is selected based on predetermined rules.

The method may comprise selecting the client which provides the strongest connection.

The method may comprising selecting the client which provides the cheapest connection.

The method may comprise selecting the client which provides the connection with the lowest interconnect fees.

According to a third embodiment, an electronic apparatus, which is a first electronic apparatus, for establishing a connection in a communication system, comprises: at least a first and a second client adapted to establish a connection in a communication system; a router including a processing device and a connection device. The processing device is adapted to determine, when a connection to the second electronic apparatus is requested, whether the first electronic apparatus and the second electronic apparatus are operating in the same network. The connection device is adapted to establish the connection using the first client if the first and second electronic apparatuses are operating in the same network, and establish the connection using the second client if the second electronic apparatus is operating in a different network than the first electronic apparatus.

The processing device may be adapted to determine an identifier for a network or network operator for the second electronic apparatus, and determine whether the determined identifier matches an identifier for the network or network operator of the first electronic apparatus.

The connection device may be adapted to use the first client to set up a CS connection.

The connection device may be adapted to use the second client to set up a PS connection.

The connection device may be adapted to use a voice over IP connection to set up the PS connection.

The connection device may be adapted to use a WLAN connection to set up the PS connection.

The processing device may be adapted to retrieve said identifier from a database stored within the first electronic apparatus.

The processing device may be adapted to retrieve said identifier from a database stored externally from the first electronic apparatus.

The electronic apparatus may be a portable or handheld mobile radio communication equipment, a mobile radio terminal, a mobile telephone, a pager, a communicator, an electronic organizer, a smartphone or a computer.

According to a further embodiment, a computer program product comprises computer program code portions for executing any of the methods when said computer program code portions are run by an electronic device having computer capabilities.

According to a fifth embodiment, a computer readable medium has stored thereon a computer program product comprising computer program code portions for executing any of the methods when said computer program code portions are run by an electronic device having computer capabilities.

Further embodiments of the invention are defined in the dependent claims.

Some embodiments of the invention provides for an electronic apparatus with a router device and methods for determining how a connection should be set up to a second electronic apparatus.

BRIEF DESCRIPTION OF THE DRAWINGS

Further objects, features and advantages of embodiments of the invention will appear from the following detailed description, reference being made to the accompanying drawings, in which.

DETAILED DESCRIPTION OF EMBODIMENTS

Figure 1:
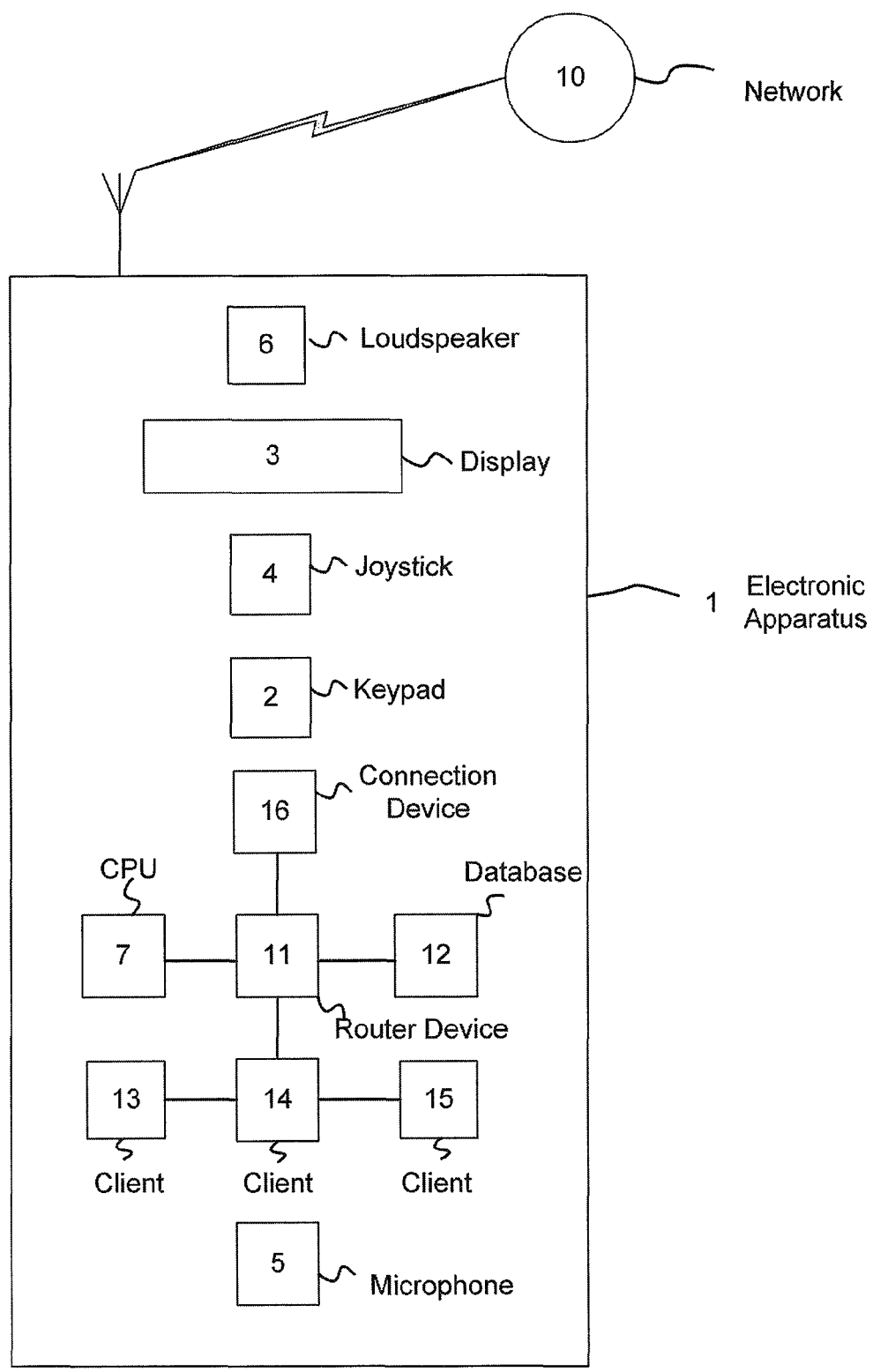
FIG. 1 is a schematic view of an electronic apparatus connected to a network.

Embodiments of the invention will be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates an electronic apparatus 1. The electronic apparatus 1 may comprise a man-machine interface, such as a keypad 2, a display 3, a joystick 4, a microphone 5 and a loudspeaker 6, through which a user may interact with the electronic apparatus 1. The electronic apparatus 1 may be a portable or handheld mobile radio communication equipment, a mobile radio terminal, a mobile telephone, a pager, a communicator, an electronic organizer, a smartphone or a computer. The electronic apparatus 1 may be connected to a network 10.

The electronic apparatus 1 may comprise various applications for carrying out functions within the electronic apparatus 1. The applications may be provided within an operational platform. Alternatively or additionally, the applications may be provided within a communication platform. The operational platform may comprise systems software run by an application processor, such as a CPU 7 (Central Processing Unit), which may also be referred to as the ACPU (Application CPU). Similarly, the communication platform may comprise both hardware and software for carrying out e.g., communication with the network 10. Thus, also the communication platform may comprise a CPU, which may be referred to as a CCPU, (Communication CPU), for providing various applications. The ACPU and the CCPU may run different operational systems. Also, the communication platform and the operational platform may interact to exchange information.

The electronic apparatus 1 further comprises a router device 11. The router device 11 determines how to establish a connection to a second electronic apparatus. According to one embodiment, the router device 11 determines whether the second electronic apparatus is located or operating within the network 10 or within a different network (not illustrated). As will be explained below in more detail, the electronic apparatus 1 may also comprise a database 12, which contains identifiers which identify the network or network operator for other electronic apparatuses. The router device 11 also comprises a connection device 16 for establishing a connection with another electronic apparatus in a known manner using clients 13-15. The plurality of clients 13-15 are used for establishing a variety of connections in the communication system as will be explained in more detail below with reference to FIG. 2. The first client may be used for establishing a circuit switched (CS) connection, while the second and third clients may be used to establish a packet switched (PS) connection.

As different types of communications networks become available, the router device 11 will have to decide which communication network to use to connect a call. The router device 11 may be programmed by, for example, the user or the network operator to follow a set of rules when deciding which client to use to set up a connection. For example, the router device 11 may be adapted to select the client which provides the connection with the strongest signal or the highest quality. Alternatively, the router device 11 may select the client which provides the cheapest connection or the connection with the lowest interconnect fees. The rules for setting up the connection may be based on other criteria and the invention is not limited to the examples given.

Figure 2:
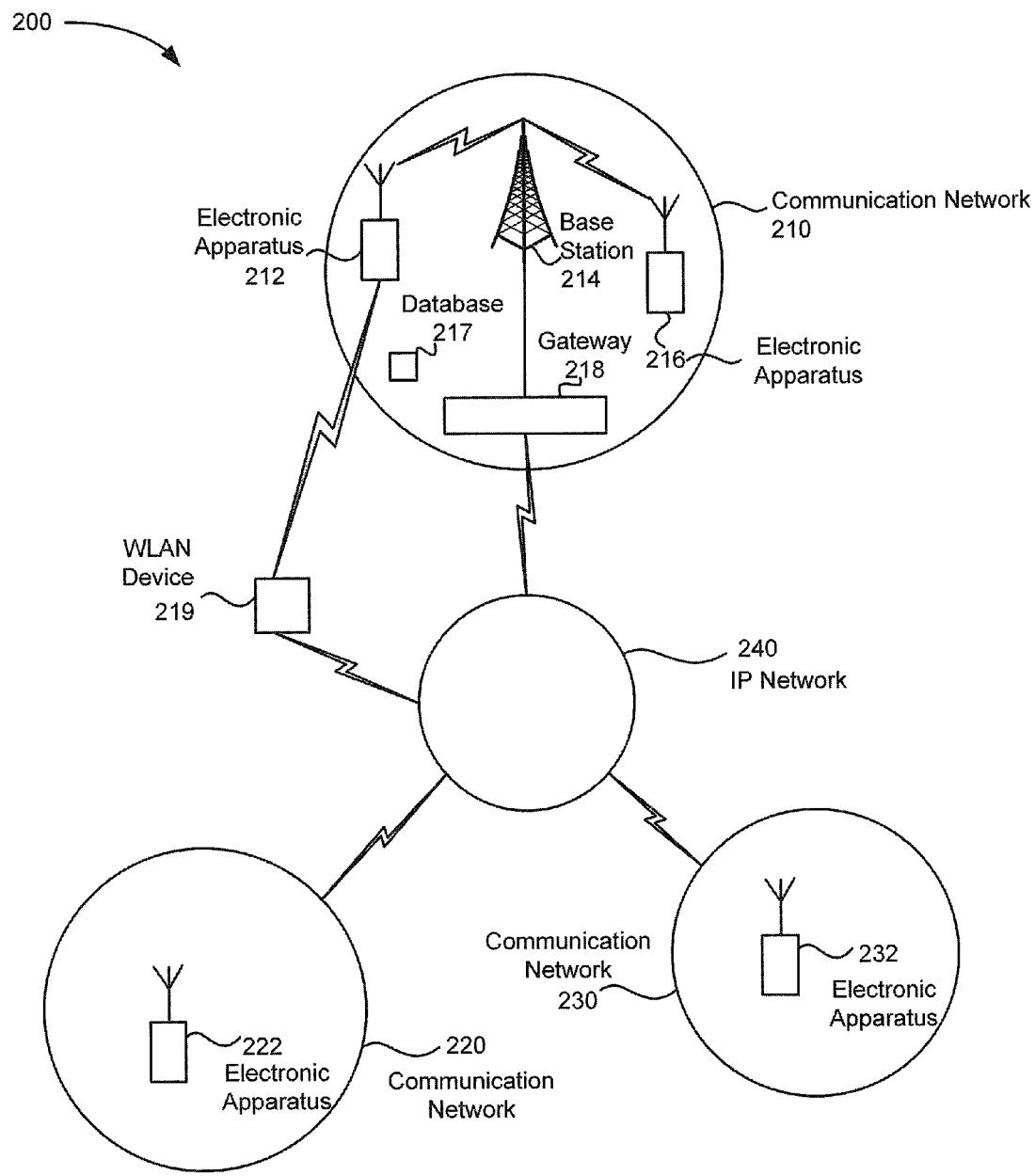
FIG. 2 is a block diagram of a communications system comprised of a plurality of networks.

FIG. 2 illustrates an embodiment of a communication system 200 within which the present invention may operate. In this illustrative example, a plurality of electronic apparatuses 212, 216, 222, 232 are operating in various communication networks 210, 220, 230, but the invention is not limited thereto. The electronic apparatus 212 can communicate with the other electronic apparatuses 216, 222, 232 using various connections as will be explained in more detail below with reference to FIG. 3.

Figure 3:
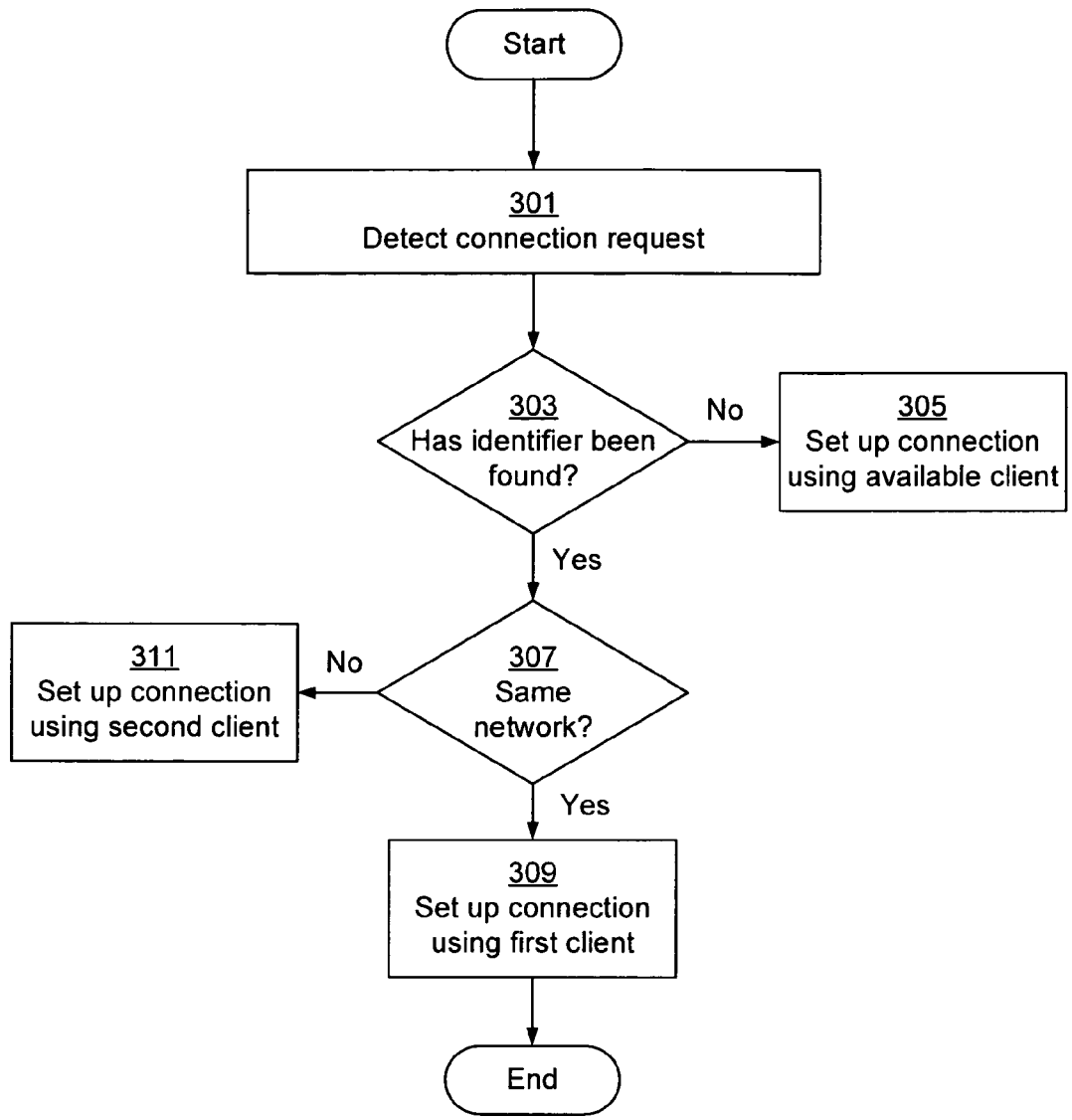
FIG. 3 is a flow chart of one embodiment of the method for establishing a connection.

FIG. 3 is a flow chart illustrating how a connection is established according to one embodiment of the invention. In this illustrative example, the router device 11 will manage the selection of client device to set up the connection to a second electronic apparatus. The router device 11 will select a first client to set up a CS connection if the electronic apparatus, to which a connection is requested, is operating in the same network as the calling electronic apparatus and will select from other available clients to set up a PS connection if the electronic apparatuses are operating in different networks. When the router device 11 determines that a connection is being requested to a second electronic device in step 301, the router device 11 needs to determine if the second electronic apparatus is operating in the same network as the first electronic apparatus 212, within which the request is generated. The request for a connection may be made by inputting, or selecting from an contact manager, a subscriber number of the second electronic apparatus.

To determine in which network the second electronic apparatus is operating, the network and/or the network operator for the second electronic apparatus may be determined. To determine the network operator or network of the second electronic apparatus, the router device 11 may locate or determine an identifier, which identifies the network or network operator of the second electronic apparatus in step 303. The identifier, for example, a specific subscriber number, may be downloaded or retrieved from a database in the electronic apparatus 212 (database 12) or from a database external to the electronic apparatus 212 (database 217). The database may be provided by the operator of the network serving the electronic apparatus 212. Alternatively, the contacts in a phone book for the electronic apparatus 212 may be marked with the identifier of the network operator or network serving the contact. The contacts can either be marked manually by the user or may be provided by the network operator for the electronic apparatus 212. If an identifier is not available for the second electronic apparatus, the router device 11 may select an available client based on a predetermined set of rules in step 305. For example, the router device 11 may select a client to set up a CS connection before trying a client to set up a PS connection, or vice versa.

If the network or network operator is not identifiable from the subscriber number, a separate identifier for the network or network operator may be provided. The separate identifier may, e.g., be a unique number, which is assigned to each network or network operator. The separate identifier may also be a notification in a contact manager, which has been manually inputted by the user, such as a cross in a box. The identification in the contact manager may also be provided by a service provider, such as the operator of the electronic apparatus. A request for the identifier may be submitted to the service provider providing this service. The request may, e.g., be submitted each time a request for a connection is made. Alternatively, the request is submitted in response to updating the contact list in this respect. Alternatively or additionally, the identifier is provided by an IMS (IP Multimedia Subsystem) service, which, e.g., may provide network identification, capabilities identification, etc. The identification received in response to submitting an identification request to a network server. The capability information may comprise information whether the second electronic apparatus is adapted for CS and/or PS connections. Then, the electronic apparatus 1 may also determine whether it at all is worth trying to set up a PS/CS connection.

In some embodiments, when the identifier of the second electronic apparatus has been acquired, it may be determined whether the acquired identifier matches an identifier for the network or network operator of the first electronic apparatus. If the identifiers match, it is determined that the first and the second electronic apparatus are operating in the same network.

Once the identifier has been found in step 303, the router device 11 checks to see if the network or network operator for the electronic apparatus 212 is the same as the network or network operator of the second electronic apparatus in step 307. If it is the same network or network operator, the router device selects a first client 13 to set up the connection to the second electronic apparatus in step 309. For example, if electronic apparatus 212 is trying to contact electronic apparatus 216, the router device 11 in electronic device 212 will use the first client 13 to set up a CS connection via, e.g., a mobile telecommunication network, such as a GSM (Global System for Mobile communications) or 3G network, since electronic apparatuses 212 and 216 are both in the same network. As a result, the connection is made via the base station 214.

In the alternative, if it is determined in step 307 that the first and the second electronic apparatuses are operating in different networks, the router device 11 sets up a PS connection. The PS connection may be established via an IP network 240, such as the Internet or a LAN (Local Area Network). In this example, the router 11 sets up the connection using the second client 14 in step 311. As illustrated in FIG. 2, if the electronic apparatus 212 is trying to contact electronic apparatus 232 in a second network 230, the router device 11 in electronic apparatus 212 will select the second client 14 to set up a PS connection, such as VoIP using, e.g., a 3G connection. The connection would be routed through a gateway 218 to the IP network 240 to the electronic apparatus 232 using VoIP. Likewise, if the electronic apparatus 212 is trying to contact electronic apparatus 222 in a third network 220, the router device 11 will select a third client to set up the PS connection using, for example, a WLAN connection. The connection may be routed through a WLAN device 219, such as a WLAN router, to the IP network 240 to the electronic apparatus 222.

Figure 4:
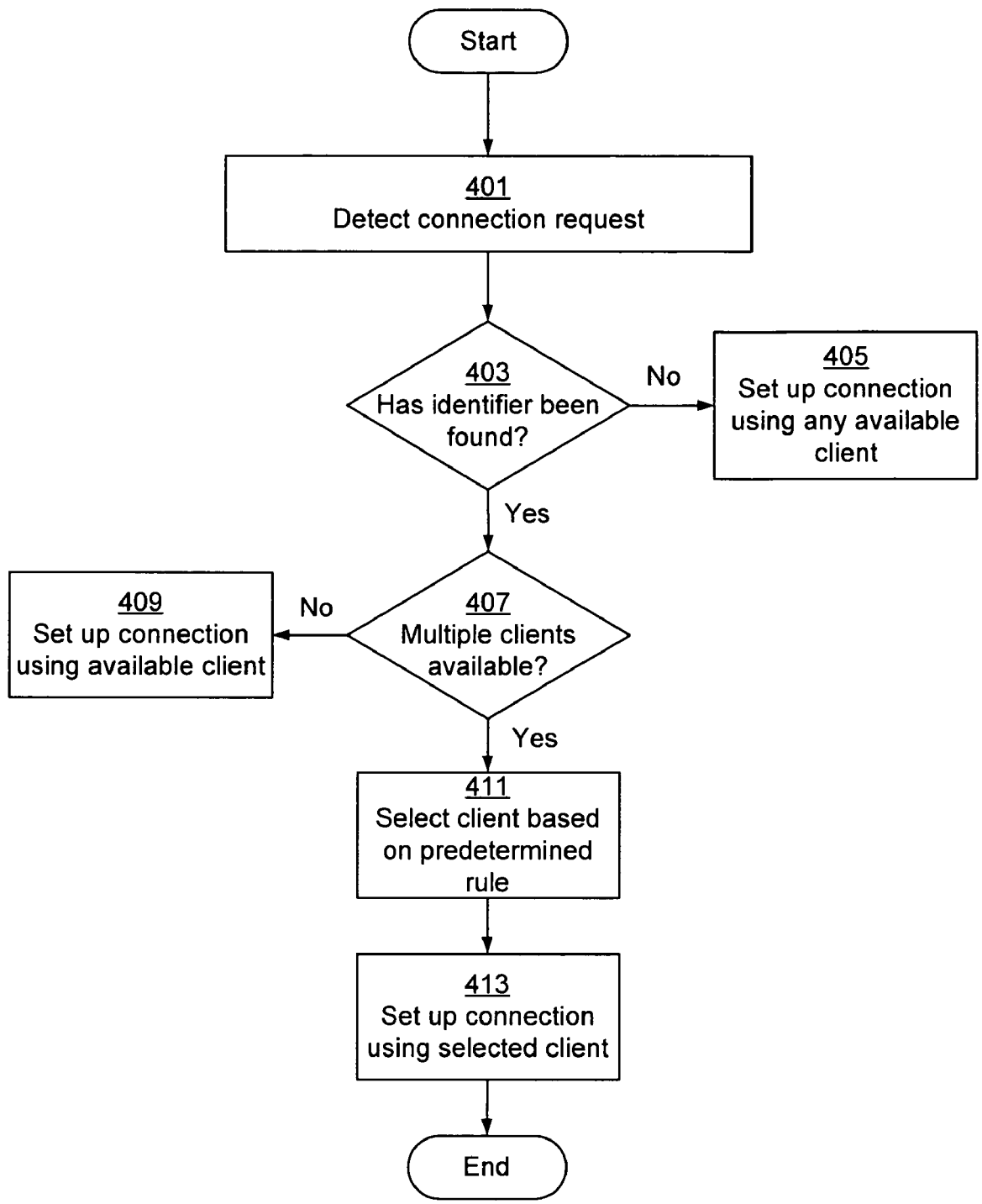
FIG. 4 is a flow chart of one embodiment of the method for establishing a connection according to one embodiment of the invention.

FIG. 4 is a flow chart illustrating how a connection is established according to another embodiment of the invention. When the router device 11 determines that a connection is being requested to the second electronic apparatus in step 401, the router device 11 determines the identity of the network or network operator of the second electronic apparatus, in step 403, as described above with reference to FIG. 3. If an identifier is not available for the second electronic apparatus, the router device 11 may select an available client based on a predetermined set of rules in step 405. For example, the router device 11 may select a first client to set up a CS connection before trying a second client to set up a PS connection, or vice versa.

If the identifier has been found for the network or network operator of the second electronic apparatus, the router device 11 determines if there are several available clients to set up the connection in step 407. If there is only one available client, the router device 11 sets up the connection using the only available client in step 409. However, when there is a plurality of clients available to set up the connection to the second electronic apparatus, the router device 11 will select one of the clients to set up the connection based on predetermined rules in step 411. As mentioned above, the router device 11 may select the client which provides the connection with the strongest signal or the highest quality. Alternatively, the router device 11 may select the client which provides the cheapest connection or the connection with the lowest interconnect fees. The rules for setting up the connection may be based on other criteria and the invention is not limited thereto. The connection is then set up using the selected client in step 413. The availability may be determined on whether operative connection to the network is present.

The router has been described above as capable of making various determinations and setting up connections. To make these determinations, the router may comprise a processing device. The functions of the processing device may, e.g., be implemented using software, which may be run by a processor, such as CPU 7. Alternatively, the processing device may be implemented by an ASIC (Application Specific Integrated Circuit) or an FPGA (Field Programmable Gate Array). The setting up of the connections may be made by the connection device. At least portions of the connection device may be implemented by software to be run by a processor, such as CPU 7. Alternatively, the processing device may be implemented by an ASIC or an FPGA. The clients may implemented in the same manner as the processing device and the communication device. For example, the functionalities of the processing device, the connection device and/or the clients may be implemented in a Java application.

Embodiments of the invention provide for flexible set up of connections. The user of the electronic apparatus does not need to actively choose which client to use each time a connections is set up. The determination of the networks, in which the electronic apparatuses are operative, may be made automatically without the need for the user to make any settings. This makes the management for setting up of connections very convenient for the user.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention may be embedded in a computer program product, which enables implementation of the method and functions described herein. The invention may be carried out when the computer program product is loaded and run in a system having computer capabilities, such as a processor. Computer program, software program, program product, or software, in the present context mean any expression, in any programming language, code or notation, of a set of instructions intended to cause a system having a processing capability to perform a particular function directly or after conversion to another language, code or notation. The computer program product may be stored on a computer readable medium.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

What is claimed is:

1. A method, in a first electronic apparatus, for establishing a connection to a second electronic apparatus using one of a plurality of clients, comprising:
   determining whether the first electronic apparatus and the second electronic apparatus, to which a connection is requested, are operating in a same network;
   establishing the connection using a first client if the first and second electronic apparatuses are operating in the same network; and
   establishing the connection using a second, different client if the second electronic apparatus is operating in a different network than the first electronic apparatus.

2. The method according to claim 1, where said determining comprises determining an identifier for a network or network operator for the second electronic apparatus; and
   determining whether the determined identifier matches an identifier for a network or network operator of the first electronic apparatus.

3. The method according to claim 1, comprising setting up a circuit switched connection when the first client is used.

4. The method according to claim 1, comprising setting up a packet switched (PS) connection when the second client is used.

5. The method according to claim 4, comprising using a voice over IP connection to set up the PS connection.

6. The method according to claim 4, comprising using a WLAN connection to set up the PS connection.

7. The method according to claim 2, comprising retrieving said identifier, for the network or network operator for the second electronic apparatus, from a database stored within the first electronic apparatus.

8. The method according to claim 2, comprising retrieving said identifier, for the network or network operator for the second electronic apparatus, from a database stored externally from the first electronic apparatus.

9. The method according to claim 8, comprising retrieving the identifier, for the network or network operator for the second electronic apparatus, from a database provided by the network operator of the first electronic apparatus.

10. The method according to claim 7, where the database is manually created by a user of the first electronic apparatus.

11. The method according to claim 1, where the first client is the client which provides a connection, which is stronger than a connection provided by any other client of the plurality of clients.

12. The method according to claim 1, where the first client is the client which provides a connection, which is cheaper than a connection provided by any other client of the plurality of clients.

13. The method according to claim 1, where the first client is the client which provides the connection with lowest interconnect fees.

14. The method according to claim 2, further comprising:
selecting any one client of the plurality of clients when an identifier for the second electronic apparatus can not be determined.

15. A method, in a first electronic apparatus, for establishing a connection using one of a plurality of clients in a communication system, the method comprising:
determining whether the first electronic apparatus and a second electronic apparatus, to which a connection is requested, are operating in a same network;
if the first electronic apparatus and the second electronic apparatus are determined to be operating in the same network,
determining if more than one client of the plurality of clients are available to be used to set up the connection to the second electronic apparatus in the same network; and
if more than one client of the plurality of clients are available, establishing the connection between the first electronic apparatus and the second electronic apparatus using a first selected client from said more than one client, where the first selected client is selected based on predetermined rules; and
if the second electronic apparatus is determined to be operating in a different network than the first electronic apparatus,
determining if more than one client of the plurality of clients are available to be used to set up the connection to the second electronic apparatus in the different network; and
if more than one client of the plurality of clients are available, establishing the connection between the first electronic apparatus and the second electronic apparatus using a second selected client from said more than one client, where the second selected client is selected based on the predetermined rules.

16. The method according to claim 15, comprising selecting the client which provides a connection, which is stronger than a connection provided by any other available client.

17. The method according to claim 15, comprising selecting the client which provides a connection, which is cheaper than a connection provided by any other available client.

18. The method according to claim 15, comprising selecting the client which provides the connection with lowest interconnect fees.

19. An electronic apparatus, which is a first electronic apparatus, comprising:
at least a first and a second client to establish a connection to a second electronic apparatus in a communication system;
a router including or connected to the at least first and second client, a processing device, and a connection device; where
the router is to determine how to establish a connection to the second electronic apparatus;
the processing device is to determine, when a connection to the second electronic apparatus is requested, whether the first electronic apparatus and the second electronic apparatus are operating in a same network; and
the connection device is to establish the connection from the first electronic apparatus to the second electronic apparatus using the first client if the first and second electronic apparatuses are operating in the same network, and establish the connection from the first electronic apparatus to the second electronic apparatus using the second client if the second electronic apparatus is operating in a different network than the first electronic apparatus.

20. The electronic apparatus according to claim 19, where the processing device is to determine an identifier for a network or network operator for the second electronic apparatus, and determine whether the determined identifier matches an identifier for a network or network operator of the first electronic apparatus.

21. The electronic apparatus according to claim 19, where the connection device is to use the first client to set up a circuit-switched (CS) connection.

22. The electronic apparatus according to claim 19, where the connection device is to use the second client to set up a packet switched (PS) connection.

23. The electronic apparatus according to claim 22, where the connection device is to use a voice over IP connection to set up the PS connection.

24. The electronic apparatus according to claim 22, where the connection device is to use a WLAN connection to set up the PS connection.

25. The electronic apparatus according to claim 20, where the processing device is to retrieve said identifier, for the network or network operator for the second electronic apparatus, from a database stored within the first electronic apparatus.

26. The electronic apparatus according to claim 20, where the processing device is to retrieve said identifier, for the network or network operator for the second electronic apparatus, from a database stored externally from the first electronic apparatus.

27. The electronic apparatus according to claim 26, where the electronic apparatus is a portable or handheld mobile radio communication equipment, a mobile radio terminal, a mobile telephone, a pager, a communicator, an electronic organizer, a smartphone or a computer.

28. A computer readable medium comprising computer executable instructions that, when executed by a processor in a first electronic apparatus, cause the first electronic apparatus to perform a method for establishing a connection from the first electronic apparatus to a second electronic apparatus, the method comprising:
determining, by the processor, whether the first electronic apparatus and the second electronic apparatus, to which a connection is requested, are operating in a same network;
establishing, by the processor, the connection from the first electronic apparatus to the second electronic apparatus using a first client if the first and second electronic apparatuses are operating in the same network; and
establishing, by the processor, the connection from the first electronic apparatus to the second electronic apparatus using a second, different client if the second electronic apparatus is operating in a different network than the first electronic apparatus.

29. A computer readable medium storing instructions that are executable by a processor in a first electronic apparatus, the instructions, when executed by the processor, cause the first electronic apparatus to perform a method, the method comprising:

determining, by the processor, whether the first electronic apparatus and a second electronic apparatus are operating in a same network;

establishing, by the processor, a connection from the first electronic apparatus to the second electronic apparatus using a first client in the first electronic apparatus if the first and second electronic apparatuses are operating in the same network, the first client providing a first type of connection; and establishing, by the processor, the connection from the first electronic apparatus to the second electronic apparatus using a second client in the first electronic apparatus if the second electronic apparatus is operating in a different network than the first electronic apparatus, the second client providing a second, different type of connection.

30. The computer readable medium of claim 28, where determining whether the first electronic apparatus and the second electronic apparatus are operating in the same network comprises:

submitting a request for an identifier, for a network or network operator for the second electronic apparatus, to a service provider associated with the second electronic apparatus.

31. The computer readable medium of claim 30, further comprising:

receiving, in response to submitting an identifier request, an identifier, for a network or network operator for the second electronic apparatus, from an Internet Protocol Multimedia Subsystem (IMS) service, where the IMS provides at least one of network identification information or capabilities identification information.

* * * * *